(12) United States Patent
Lee et al.

(10) Patent No.: US 6,384,837 B1
(45) Date of Patent: May 7, 2002

(54) SYMBOL COLOR COMPENSATING METHOD FOR COLOR DISPLAY SYSTEM

(75) Inventors: Kwang-Chun Lee, Kumi; Yeong-Ho Ha, Daeku; Jin-Seob Kim, Kumi, all of (KR)

(73) Assignee: LG Electronics Inc. (KR)

( * ) Notice: Subject to any disclaimer, the term of this patent is extended or adjusted under 35 U.S.C. 154(b) by 0 days.

(21) Appl. No.: 09/208,213

(22) Filed: Dec. 9, 1998

(30) Foreign Application Priority Data

Dec. 9, 1997 (KR) .............................. 97-66976

(51) Int. Cl.[7] .............................. G09G 5/02; H04N 9/64
(52) U.S. Cl. .................... 345/589; 345/590; 345/591; 345/592; 345/593; 345/594; 348/652; 348/653
(58) Field of Search .................. 345/150, 152, 345/197, 431, 432, 589–602; 348/643–654, 743–745

(56) References Cited

U.S. PATENT DOCUMENTS

| | | | | |
|---|---|---|---|---|
| 4,689,669 A | * | 8/1987 | Hoshino et al. ............ | 345/153 |
| 5,488,429 A | * | 1/1996 | Kojima et al. ............. | 348/653 |
| 5,574,513 A | * | 11/1996 | Topper ....................... | 348/653 |
| 5,585,860 A | * | 12/1996 | Takeshima .................. | 348/652 |
| 5,907,315 A | * | 5/1999 | Vlahos et al. .............. | 345/154 |
| 6,169,536 B1 | * | 1/2001 | Lee et al. ................... | 345/150 |

* cited by examiner

*Primary Examiner*—Jeffery Brier
*Assistant Examiner*—Anthony J. Blackman
(74) *Attorney, Agent, or Firm*—Ostrolenk, Faber, Gerb & Soffen

(57) ABSTRACT

A symbol color compensating method for a color display system includes the steps of detecting colors of a plurality of pixels from an image being displayed, calculating an entire frequency number of flesh tone, blue and green colors from the detected colors, selecting one color among the flesh tone, blue and green colors when the calculated frequency number thereof is more than a predetermined value, and controlling a color density and a brightness value of the displayed image in accordance with the selected color.

3 Claims, 10 Drawing Sheets

REFERENCE:fsc
INPUT:C 2.83V (1.415)
1.75V (0.875)

REFERENCE:C
INPUT:fsc 4.24V (2.12)
2.96V (1.48)

| Color<br>Sat(%) | Burst | Blue | Magenta | Red | Green | Cyan | Yellow |
|---|---|---|---|---|---|---|---|
| 130 | 0.24 | 2.20 | 0.93 | 1.30 | 3.37 | 2.95 | 0.25 |
| 110 | 0.24 | 2.20 | 0.93 | 1.30 | 3.37 | 2.95 | 0.25 |
| 90 | 0.24 | 2.25 | 0.93 | 1.35 | 3.37 | 2.95 | 0.25 |
| 70 | 0.24 | 2.28 | 0.97 | 1.40 | 3.41 | 2.97 | 0.31 |
| 50 | 0.24 | 2.33 | 1.06 | 1.49 | 3.46 | 3.00 | 0.35 |
| 30 | 0.24 | 2.31 | 1.10 | 1.55 | 3.52 | 3.09 | 0.31 |
| Diff. | 0 | 0.13 | 0.17 | 0.25 | 0.15 | 0.14 | 0.10 |

FIG.8

| Color<br>Sat(%) | Flesh tone | | | Blue | | | Green | | |
|---|---|---|---|---|---|---|---|---|---|
| | +10° | Center | −10° | +10° | Center | −10° | +10° | Center | −10° |
| 130 | 0.60 | 0.72 | 0.84 | 2.08 | 2.19 | 2.27 | 3.26 | 3.35 | 3.44 |
| 100 | 0.64 | 0.78 | 0.90 | 2.09 | 2.21 | 2.29 | 3.26 | 3.34 | 3.46 |
| 80 | 0.69 | 0.83 | 0.94 | 2.15 | 2.25 | 2.32 | 3.26 | 3.35 | 3.47 |
| 60 | 0.70 | 0.82 | 0.93 | 2.23 | 2.30 | 2.38 | 3.30 | 3.41 | 3.51 |
| 40 | 0.60 | 0.79 | 0.79 | 2.28 | 2.33 | 2.45 | 3.40 | 3.49 | 3.64 |
| Diff. | 0.34 | | | 0.37 | | | 0.38 | | |

FIG. 10

| Ref.<br>AD value | Flesh tone | | Blue | | Green | | |
|---|---|---|---|---|---|---|---|
| | 0.6(V) | 0.9(V) | 2.1(V) | 2.4(V) | 3.3(V) | 3.6(V) | |
| AD1 | L | H | H | H | H | H | H |
| AD2 | L | L | H | H | H | H | H |
| AD3 | L | L | L | H | H | H | H |
| AD4 | L | L | L | L | H | H | H |
| AD5 | L | L | L | L | L | H | H |
| AD6 | L | L | L | L | L | L | H |

SYMBOL COLOR COMPENSATING METHOD FOR COLOR DISPLAY SYSTEM

BACKGROUND OF THE INVENTION

1. Field of the Invention

The present invention relates to a symbol color compensating technology for a color display system such as a television set, and more particularly, to an improved symbol color compensating method for a color display system wherein a color density and brightness are controlled on the basis of one selected from a variety of image colors being displayable on the color display system.

2. Description of the Background Art

In order to reproduce symbol colors using a color processing image system such as a TV or a monitor, it is important to reproduce a flesh tone, a blue color and a green color for reproduction and evaluation of colors since the flesh tone, blue and green colors are recognized by viewers as significant remembrance colors. The flesh tone has its value as a reference color, the blue color is related to a three-stimulus value and the green color is a color must sensitive to the human visual sense.

Proposals have been made to detect and compensate particular colors in such color display systems as TVs and monitors. One of them is to adjust demodulation the axes of R-Y and B-Y signals. This is to adjust the magnitude of a relative vector value of the colors with regard to color demodulation axes, wherein the flesh tone is set as a reference color among a variety of symbol colors so that the demodulation axes are moved toward the reference color by as much as a predetermined phase angle. However, this method has disadvantage in that all the reproduced colors are concurrently changed without regard to the existence of the reference color in the image-received frame when a image is received in a TV in real time. Further, the relative vector value is decreased with regard to the demodulation axes, thereby disadvantageously deteriorating the color density in the reproduced image.

In order to overcome such drawbacks, there was introduced a method for detecting a particular symbol color from the slope of the color-modulated value by use of R-Y and B-Y values received from a microcomputer in the display system. Under the present NTSC mode, the R-Y and B-Y values are appropriately combined on the basis of the R-Y and B-Y values of the color demodulation axes, for thereby reproducing the colors transmitted to a color image display device. For that purpose, a maximal value and a minimal value are obtained with regard to the R-Y and B-Y values while changing respective phase angles of flesh tone, blue and green experimentally by as much as ±10% from the reference phase.

FIG. 1 is a graph illustrating a color phase distribution of flesh tone, blue and green with regard to demodulated color values, wherein the horizontal axis denotes B-Y values and the vertical axis denotes R-Y values. The shaded portions represent a flesh tone region, a blue region, and a green region.

According to the experimental result, as shown in FIG. 1, the minimal and maximal B-Y values for the flesh tone are 3.283 and 3.395, and the minimal and maximal R-Y values for the flesh tone are 3.868 and 2.922. The minimal and maximal R-Y values for green are 3.554 and 3.641. The minimal and maximal B-Y values for blue are 2.492 and 2.532. The minimal and maximal R-Y values for blue are 3.112 and 3.273.

In order to detect symbol colors on the basis of the demodulated values, with regard to flesh tone, blue and green, the following method is employed.

First, 3.1 is subtracted from the R-Y, B-Y values inputted in the microprocessor, respectively. Secondly, the respective slopes of the B-Y and R-Y values are obtained. Thirdly, the respective colors corresponding to the inputted values on the basis of the obtained slope values are sorted into one of the flesh tone, blue and green. In other words, if the R-Y and B-Y values of the inputted values belong to the shaded portions in FIG. 1, the inputted values are respectively assigned to flesh tone, blue and green; otherwise, the inputted values are assigned to the original colors.

However, such a conventional method also has a disadvantage in that an additional parameter must be provided to accurately detect the symbol colors.

SUMMARY OF THE INVENTION

The present invention is directed to overcoming the conventional disadvantages.

Therefore, it is an object of the present invention to provide a symbol color compensating method for a color display system wherein the symbol colors are compensated by a method using flesh tone, blue and green which serve as reference colors and wherein the three colors are important for color reproduction and color evaluation.

It is another object of the present invention to provide a symbol color compensating method for a color display system wherein the symbol colors are reproduced without influencing the colors other than flesh tone, blue and green.

To achieve the above-described object, there is provided a symbol color compensating method for a color display system according to the present invention which includes the steps of detecting colors of a plurality of pixels from an image being displayed, calculating an entire frequency number of flesh tone, blue and green colors from the detected colors, selecting one color of the flesh tone, blue and green colors when the calculated frequency number is more than a predetermined value, and controlling a color density and a brightness value in accordance with the selected color.

The objects and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein:

FIG. 7 is a table illustrating output characteristics for the phase detector of color bar signals versus color density variation;

FIG. 8 is a table illustrating output voltages of the phase detector with regard to the color density variation when the phases for flesh tone, blue and green are varied;

FIG. 10 is a table illustrating the state of a bit stream outputted from the comparator in FIG. 9;

DETAILED DESCRIPTION OF THE INVENTION

With reference to the accompanying drawings, the symbol color compensating method for a color display system according to the present invention will now be described.

A plurality of evenly distributed pixels are selected from the entire pixels in one frame and the colors of the selected pixels are detected.

Figure 1:
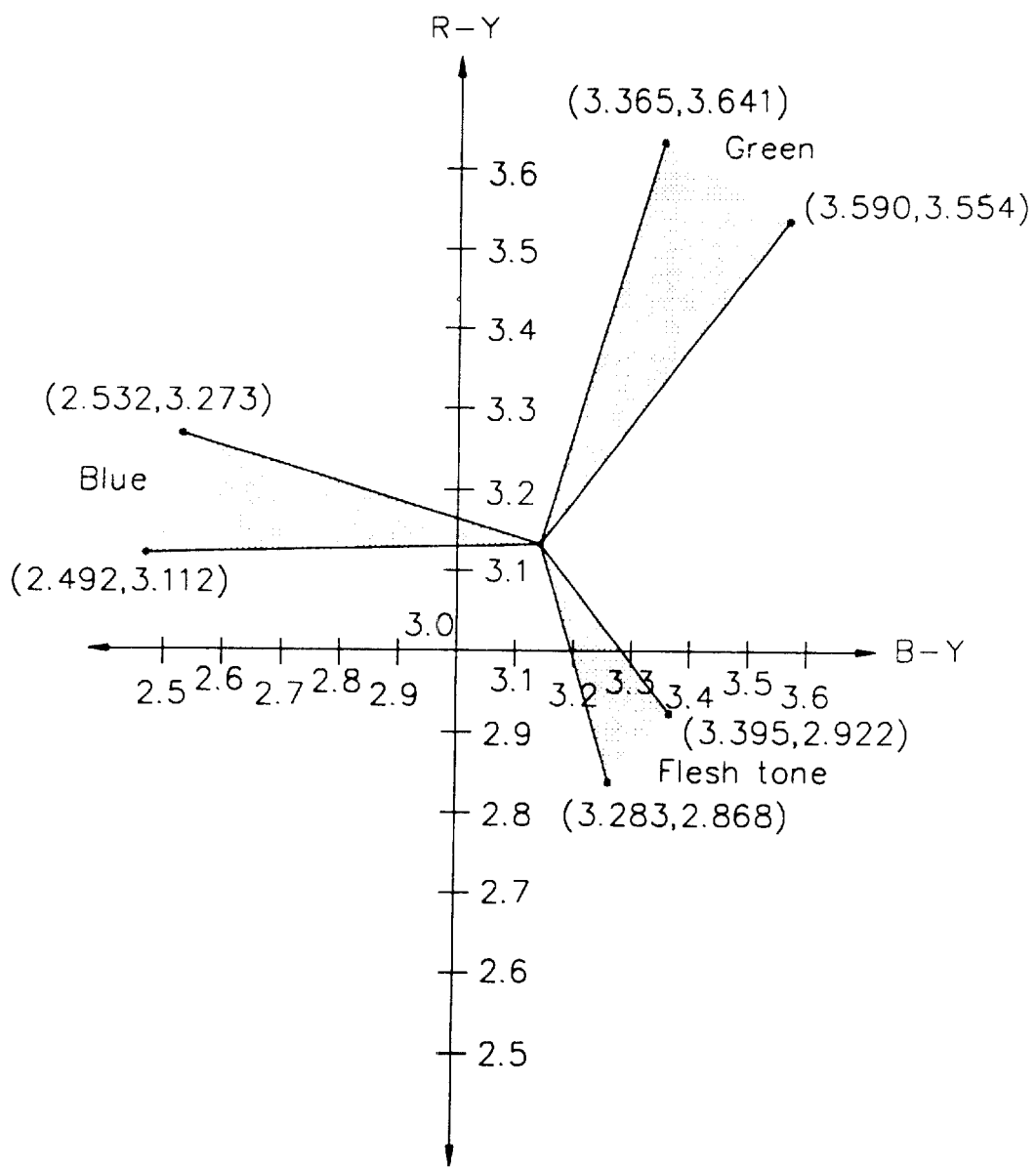
FIG. 1 is a graph illustrating a distribution of flesh tone, blue and green on the basis of demodulated color difference signal phase angle values.
Figure 2:
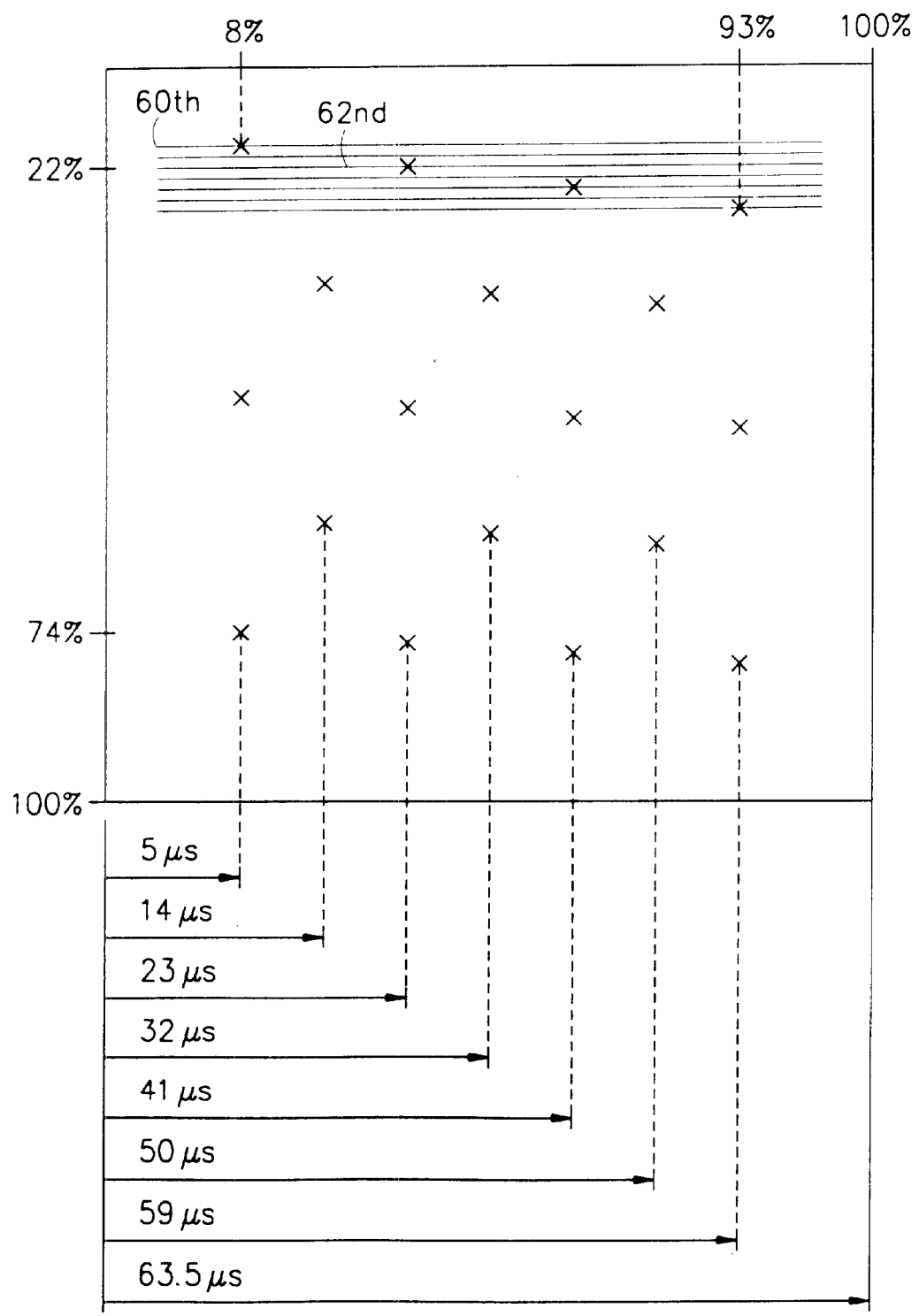
FIG. 2 is a view illustrating pixel locations selected for color detection within one frame according to the present invention.

FIG. 2 is a view illustrating pixel locations selected for color detection within one frame according to the present invention, wherein 18-pixels in different location within one frame are selected for color detection.

The box illustrated in FIG. 2 represents an entire screen (frame), and the pixels marked "x" on the screen are used to detect symbol colors. The numbers put down near the pixels denote horizontal scanning line numbers. The numbers below the box represent respective horizontal line scanning times which correspond to the pixel locations in the box, assuming that an entire horizontal scan line period is 63.5 μs. Here, the 18 pixels are evenly distributed.

First, the symbol color of a pixel positioned 5 μs from the left-end and in the 60th horizontal line from the top of the screen is detected. Next, the symbol color of a pixel positioned 14 μs from the left-end and in the 62nd horizontal line from the top of the screen is detected. Likewise, the respective symbol colors corresponding to the 18 pixels are detected from the frame. Then, the overall color density and brightness are controlled on the basis of the detected 18 symbol colors.

The reason why the first pixel color is detected from the 60th horizontal line and the second pixel color from the 62nd horizontal line is that a color processing time of the detected first pixel should be considered. If the time taken to process the detected color is sufficiently short, colors of more than one pixel may be detected from one line.

With reference to FIGS. 3 through 11, the symbol color determination steps to judge colors of the detected pixels will now be described.

Figure 3:
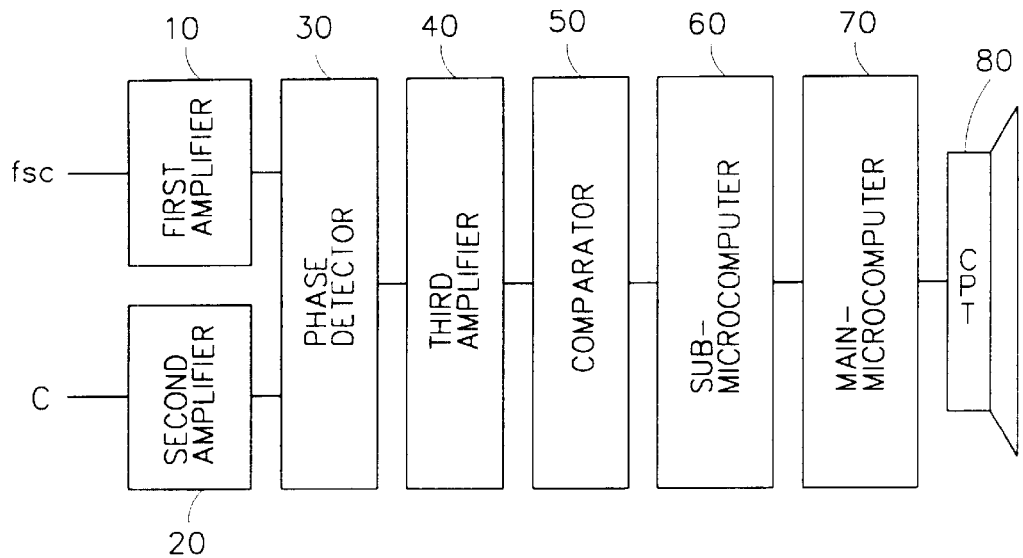
FIG. 3 is a block diagram illustrating a symbol color compensating apparatus for carrying out a method according to the present invention.

FIG. 3 is a block diagram illustrating a symbol color compensating apparatus for carrying out the operation according to the present invention. As shown therein, a 3.58 MHz color subcarrier signal fsc of the corresponding pixel is applied to a first amplifier 10, and a color signal C is applied to a second amplifier 20. The first amplifier 10 amplifies the color subcarrier signal fsc and the second amplifier 20 amplifies the color signal C. A phase detector 30 compares the respective phases of the amplified color subcarrier signal fsc and the color signal C and outputs a difference voltage which is in proportion to the phase difference. The outputted difference voltage is amplified by a third amplifier 40 and applied to a comparison section 50. The comparison section 50 includes a plurality of comparators which are respectively set by reference voltages to distinguish flesh tone, blue and green from one another, and the comparators respectively output a plurality of high or low level voltages in accordance with the comparisons against the respective reference voltages. A submicroprocessor 60 combines the plurality of received voltages and determines the symbol colors. A main microprocessor 70 adjusts the color density and brightness in accordance with the determined results for color compensation and the compensated color signal is transmitted to a color picture tube (CPT) 80.

Figure 4A:
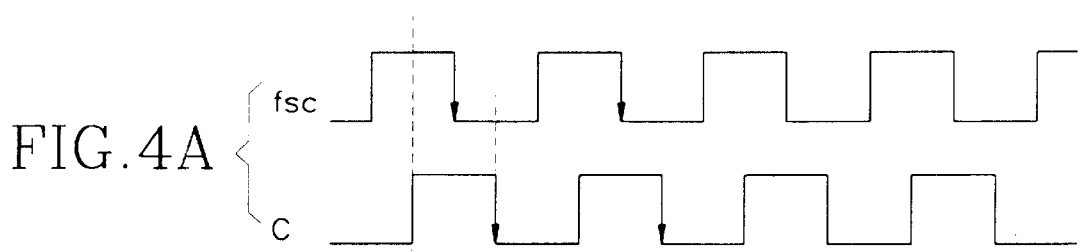
FIGS. 4A through 4C are timing diagrams illustrating output voltages of a phase detector in the apparatus of FIG. 3, with regard to two phase-different input signals.
Figure 4B:
Figure 4C:
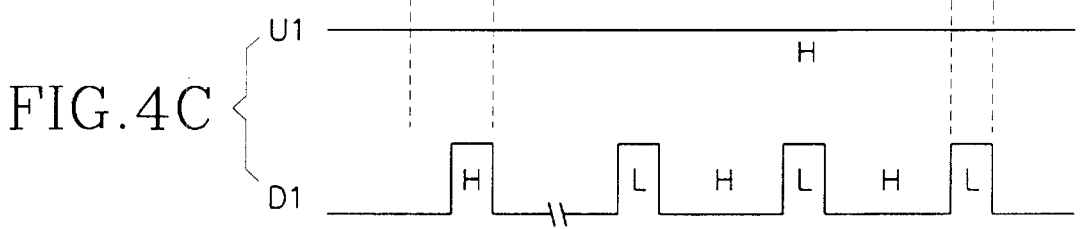

FIGS. 4A through 4C are timing diagrams of input/output signals of the phase detector 30. The operational characteristic of the phase detector 30 will now be described.

If for example the color subcarrier signal fsc amplified in the first amplifier 10 and the color signal C amplified in the second amplifier 20 are represented by the respective wave forms in FIG. 4A, the phase detector 30 outputs respective voltages U1, D1.

FIG. 4B illustrates wave forms of output voltages U1, D1 when the color signal C is determined as a reference voltage by the phase detector 30. FIG. 4C illustrate wave forms of output voltages U1, D1 when the color subcarrier signal fsc is determined as a reference signal by the phase detector 30.

Figure 5A:
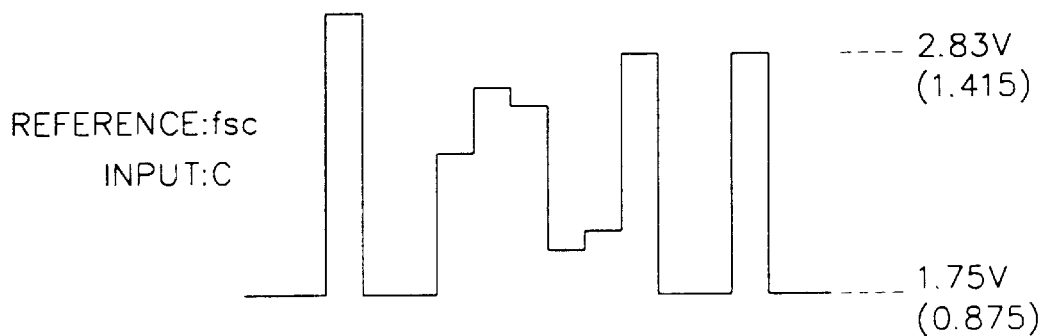
FIGS. 5A through 5C are timing diagrams of the phase detector with regard to a color bar signal.
Figure 5B:
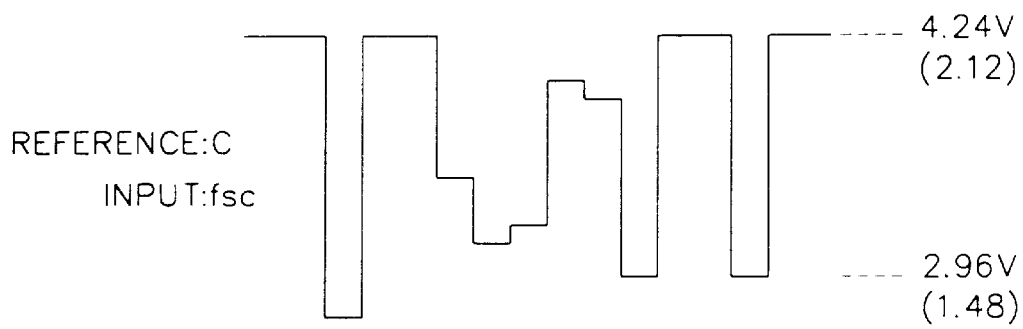
Figure 5C:
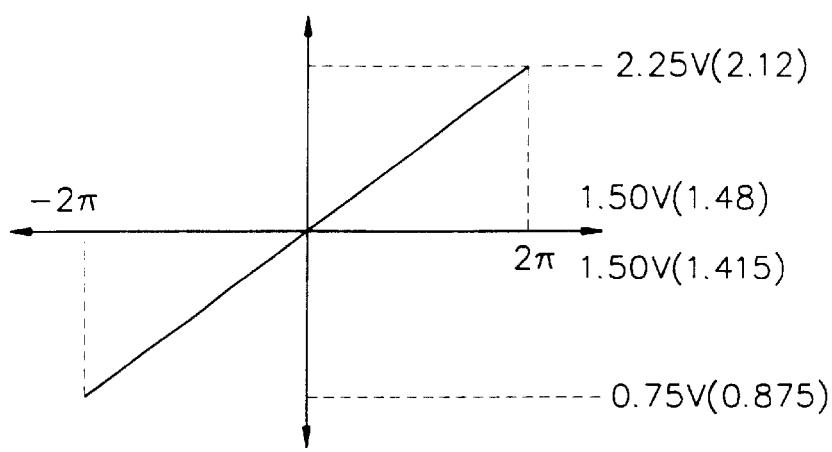
Figure 6:
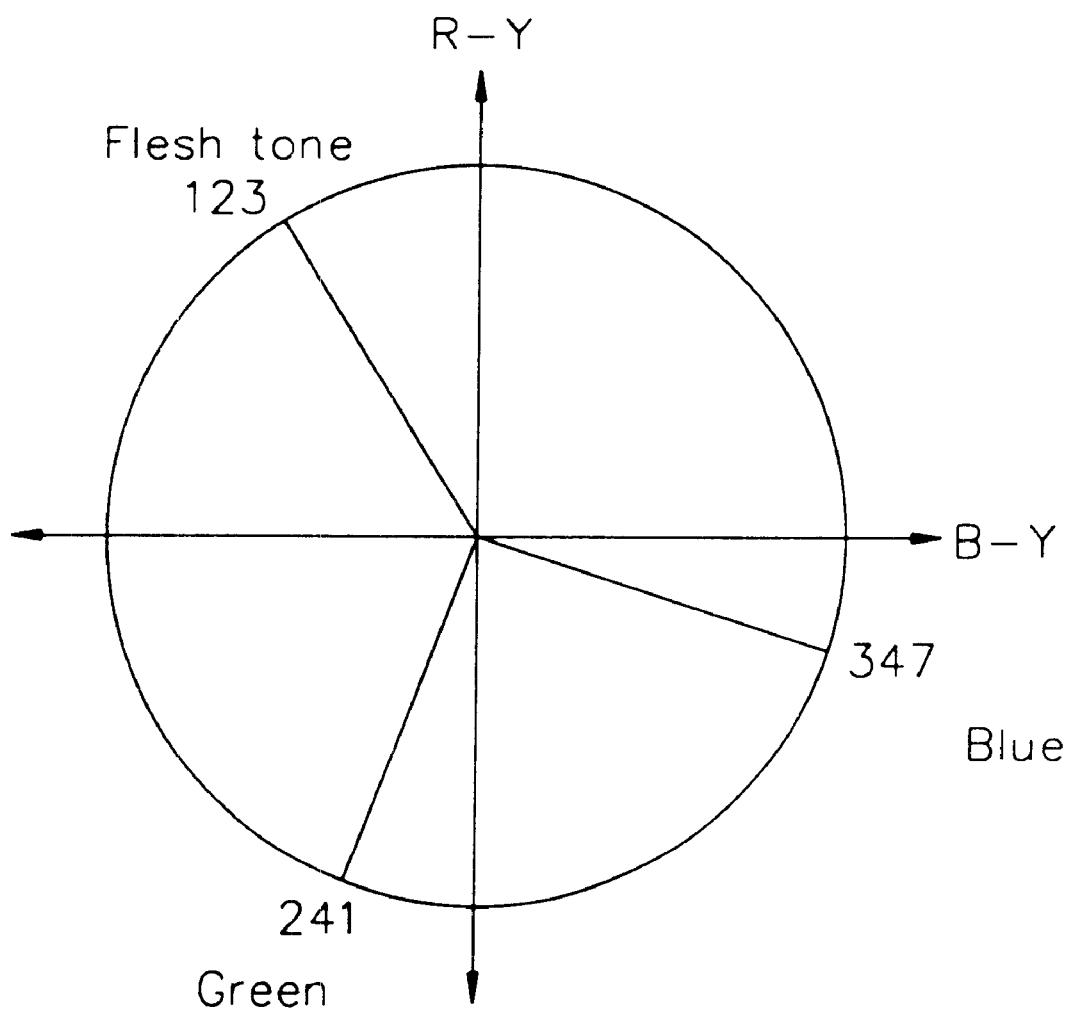
FIG. 6 is a view illustrating the phases for the color modulation axes of flesh tone, blue and green selected in the present invention.

Specifically, in case that the color subcarrier signal fsc is set as a reference phase and the color signal C is set as an input as shown in FIG. 5A, and in case that the color signal is set as a reference phase and the color subcarrier signal fsc is set as an input as shown in FIG. 5B, a relative voltage with regard to the color subcarrier signal and an output voltage with regard to the input phase are as shown in FIG. 5C.

The relative phases with regard to the color demodulation axes are 123° for flesh tone, 241° for blue and 347° for green, so that noise becomes intense adjacent to the respective phases of the three symbol colors and accordingly a further accuracy for the output voltage characteristic is required with regard to the phases. For that purpose, the output voltage of the first amplifier 10 is set at 1.5V, and the output voltage of the second amplifier 20 is set at 1V, and also the signal portions are minutely adjusted to 100 ns and 210 ns for duty cycle, respectively.

In a state in which the output voltage of the phase detector 30 is stabilized, the relative output voltages with regard to a color bar signal for detecting symbol colors selected from the color subcarrier signal fsc are as shown in FIG. 7.

Meanwhile, it is required to restrict the range of symbol colors selected by viewers for the real reproduction of the symbol colors. For that purpose, respective phases of flesh tone, blue and green are set by ±10 with reference to the reference phase and the output voltage values of the phase detector 30 are as shown in FIG. 8. The output voltage is applied to amplifier 40 which then amplifies the received voltage to an appropriate level so as to allow the comparison section 50 to recognize the voltage and outputs the resultant value.

Figure 9:
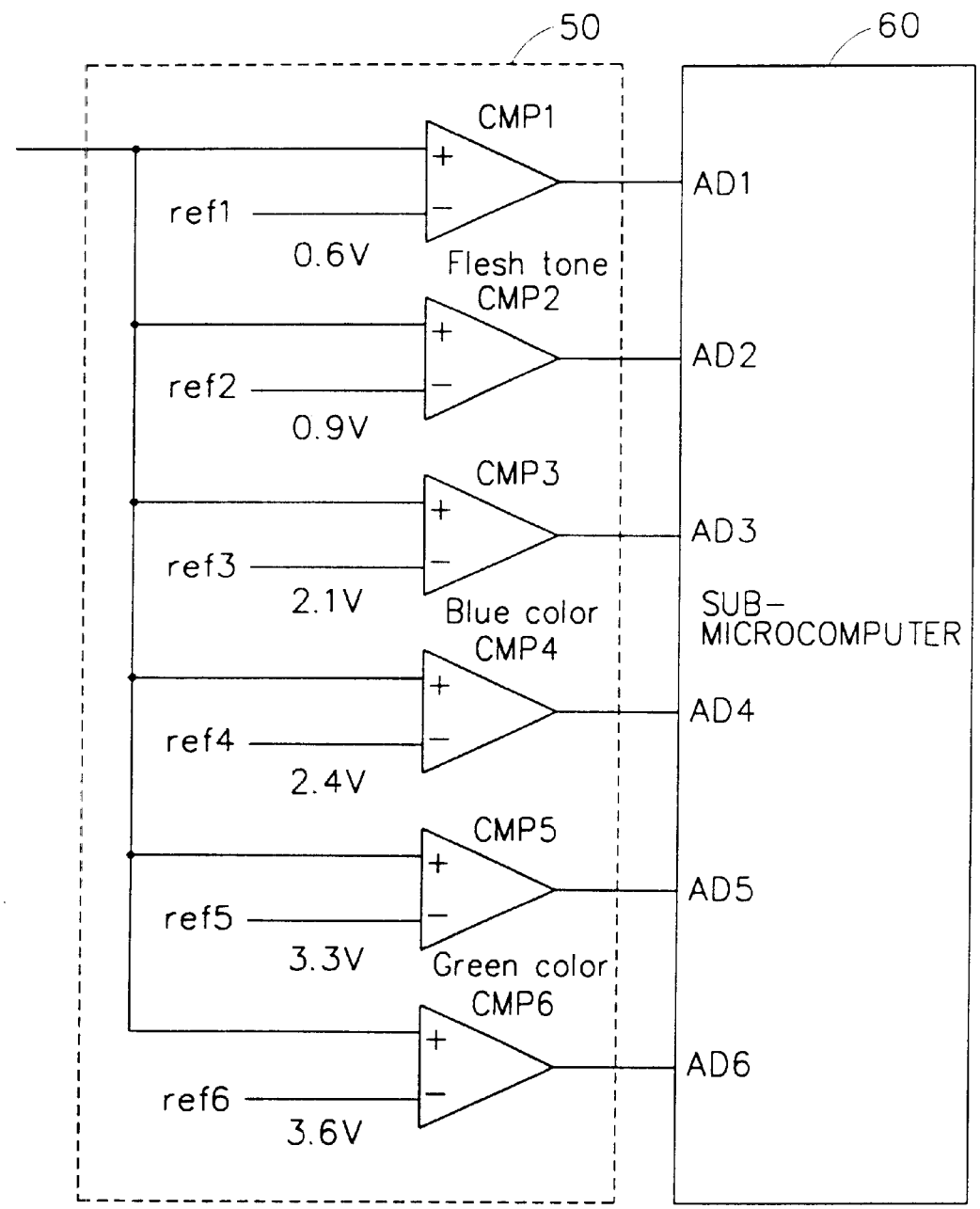
FIG. 9 is a schematic circuit diagram of a comparator in the apparatus of FIG. 3.

FIG. 9 illustrates a schematic circuit view detailing the comparison section 50 according to an embodiment of the present invention. As shown in FIG. 9, the comparison section 50 is provided with six comparators CMP1–CMP6 to each of which is applied the signal from the third amplifier 40. The respective comparators CMP1–CMP6 output high or low level voltages in accordance with the respective reference levels ref1–ref6 applied thereto. In an embodiment of the present invention, the first reference voltage ref1 is 0.6V, the second reference voltage ref2 is 0.9V, the third reference voltage ref3 is 2.1V, the fourth reference voltage ref4 is 2.4V, the fifth reference voltage ref5 is 3.3V, and the sixth reference voltage ref6 is 3.6V. The respective output voltages of the comparators CMP1–CMP6 are respectively applied to six input terminals AD1–AD6 of the sub-microcomputer 60.

The sub-microcomputer 60 combines the respective levels applied to the six input terminals AD1–AD6 so as to determine the symbol colors, and the determined symbol color information is outputted to the main microcomputer 70. Here, the references for determining the symbol colors are set in the sub-microcomputer 60.

The operation for determining the symbol colors will now be described with reference to FIG. 10.

FIG. 10 is a table illustrating a bit stream outputted from the comparison section 10 in FIG. 9 so as to present symbol colors determined depending upon the voltage levels applied to the respective input terminals AD1–AD6 of the sub-microcomputer 60.

For example, if the voltage applied to the comparison section 50 is lower than 0.6V, the respective voltage levels applied to the six input terminals AD1–AD6 all become low level. In this case, the sub-microcomputer 60 determines the symbol color as flesh tone.

If the voltage applied to the comparison section 50 remains between 2.1V and 2.4V, the respective voltage levels applied to the three input terminals AD1–AD3 all become high level and the respective voltage levels applied to the other three input terminals AD4–AD6 all become low level. In this case, the sub-microcomputer 60 determines the present symbol color as blue color.

Also, if the voltage applied to the comparison section 50 is higher than 3.6V, the respective voltage levels applied to the six input terminals AD1–AD6 all become high level. In this case, the sub-microcomputer 60 determines the symbol color as green color.

The symbol color determining step as described above is carried out at step S10 in FIG. 11, which is a flow chart illustrating the symbol color compensating method for a color display system according to a first embodiment of the present invention.

When carrying out a symbol color determining step for the 18 pixels, the information of the determined 18 symbol colors is saved in the sub-microcomputer 60. When the determination for the 18 symbol colors is completed, the step S11 is satisfied.

In steps S12–S14, one color is selected depending upon the respective frequency numbers of the detected colors so as to determine the reference for controlling the color density and brightness, and the steps are carried out in the main microcomputer 70. The operation is as follows.

Considering that preferential rankings in terms of human visual sensitivity follow the orders of flesh tone, blue and green, the flesh tone, blue and green are numbered in order. Here, only in case that the frequency number detected as flesh tone, blue and green among the symbol colors detected 18 times is larger than seven, the color compensation is carried out; otherwise, it is not carried out.

In step S12, among the 18 times detected symbol colors, if the frequency number detected as flesh tone, blue and green is larger than seven, the step S13 is carried out.

Also, in step S13, it is determined whether the flesh tone is detected from the symbol colors detected more than 7 times, and if the flesh tone is not detected, the step 14 is carried out to determine whether green color is detected.

If the step S13 is satisfied, it means that the flesh tone is selected as a reference color, whereas if the step S14 is satisfied, it means that the green color is selected as a reference color, and if the step S14 is not satisfied, it means that the blue color is selected as a reference color.

The main microcomputer 70 determines the reference colors as described above. According to the determined reference color, the color density and brightness of an image being displayed on the CPT 80 are controlled (steps S15, S16, S17).

As described above, in the first embodiment of the method according to the present invention, one of the three colors are selected as a reference color in the order of flesh tone, blue and green, whereby the color density and brightness of an image are controlled for thereby improving picture quality.

Figure 12:
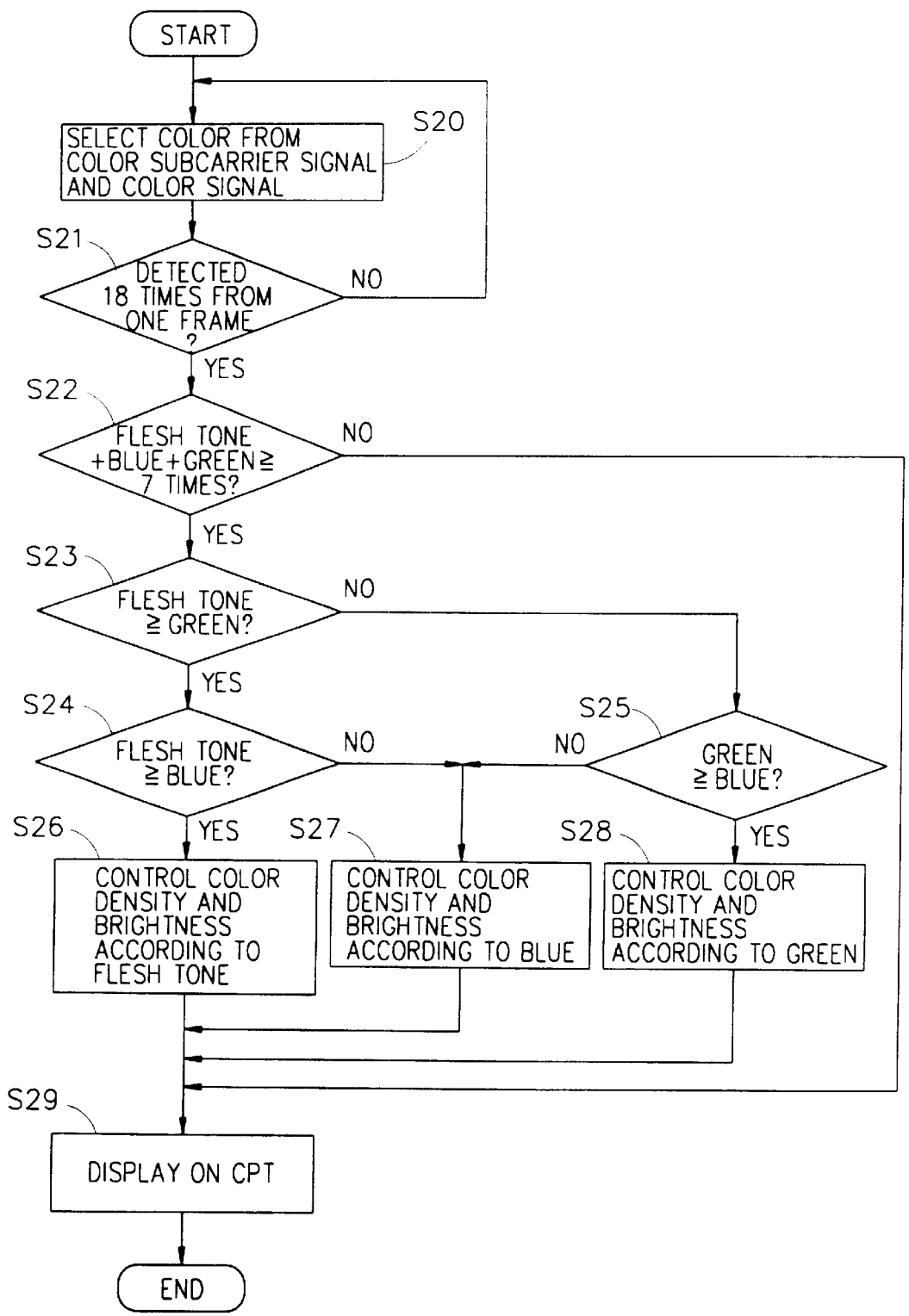
FIG. 12 is a flow chart illustrating a symbol color compensating method for a color display system according to a second embodiment of the present invention.

With reference to FIG. 12, a second embodiment of the method according to the present invention will now be described.

FIG. 12 is a flow chart illustrating the symbol color compensating method for a color display system according to a second embodiment of the present invention.

In the second embodiment, the frequency numbers of the detected flesh tone, blue and green colors are compared with one another, and the color density and brightness are controlled on the basis of the color most frequently detected thereamong. For that purpose, the apparatus as shown in FIG. 3 and employed for performing the method of the first embodiment according to the present invention may also be employed.

The symbol color determination steps of the method of the second embodiment are identical to those of the first embodiment.

Specifically, a plurality of evenly distributed pixels are selected from the entire pixels in one frame and the colors of the selected pixels are detected accordingly. Then, the color occurrence of the detected pixels is determined. That is, the steps S20 and S21 in Figure the flowchart of 12 are the same as steps S10 and S11 in FIG. 11.

Figure 11:
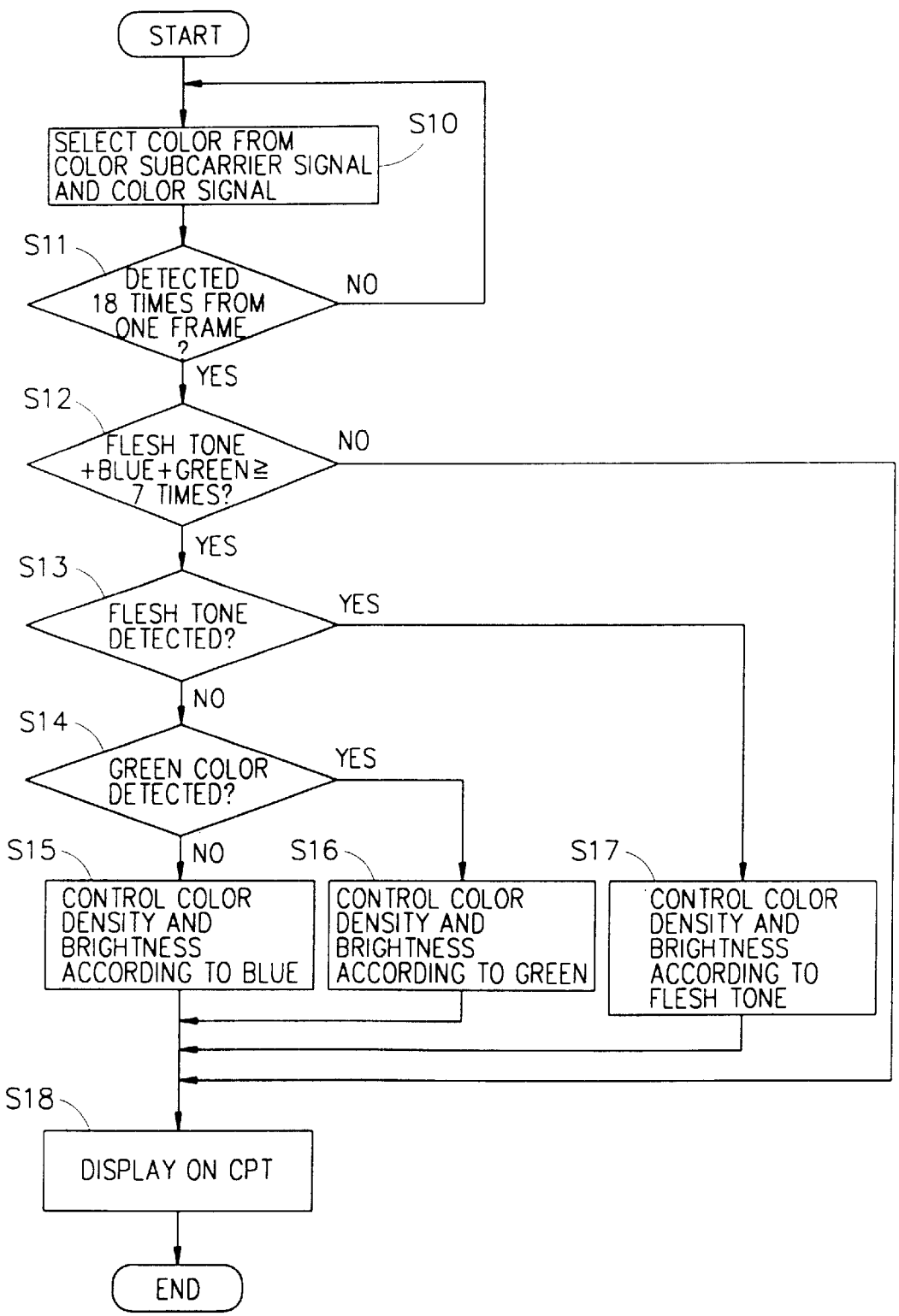
FIG. 11 is a flow chart illustrating a symbol color compensating method for a color display system according to a first embodiment of the present invention.

Also, step S22 in FIG. 12 is the same as step S12 in FIG. 11. That is, the color compensation is carried out only when the entire frequency number detected as flesh tone, blue and green colors among the 18 times detected symbol colors is larger than seven; otherwise, it is not carried out.

Next, in steps S23, S24 and S25, the detected frequency numbers of flesh tone, blue and green colors among the detected colors are compared with one another, and if the condition is satisfied then it is compared in step S24 whether the flesh tone detected frequency number is larger than the blue color detected frequency number.

If step S24 is satisfied, it means that the flesh tone is most predominantly detected, in which case the color density and brightness according to the flesh tone are controlled in step S26.

Meanwhile, in step S23, if the flesh tone detected frequency number is less than the green color detected frequency number, the condition is not satisfied and it is compared in step S25 whether the green color detected frequency number is larger than the blue color detected frequency number. If the condition for step S25 is satisfied, it means that the green color is most predominantly detected among the three colors, in which case the color density and brightness according to the green color are controlled in step 28.

Also, if the blue color detected frequency number is larger than the green color detected frequency number, it means that the blue color is most predominantly detected among the three colors, in which case the conditions for steps S24, S25 are not satisfied and the color density and brightness according to the blue color are controlled in step 27.

As described above, in the method according to the second embodiment of the present invention, the most frequently detected color among flesh tone, blue and green colors is selected as a reference color and the color density and brightness of an image are controlled by the selected color, thereby improving the perceived picture quality.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A symbol color compensating method for a color display system, comprising the steps of:

detecting a plurality of reference colors of evenly distributed pixels from an image being displayed;

calculating an entire frequency number of the plurality of reference colors;

selecting one reference color among the plurality of reference colors whose calculated frequency number are more than a predetermined frequency number; and controlling a color density and a brightness value of the displayed image in accordance with the selected reference color;

wherein the one reference color is selected in a sequential order of a flesh tone, blue color and green color.

2. A symbol color compensating method for a color display system, comprising the steps of:

detecting a plurality of reference colors of evenly distributed pixels from an image being displayed;

calculating an entire frequency number of the plurality of reference colors;

selecting one reference color among the plurality of reference colors whose calculated frequency number are more than a predetermined frequency number; and controlling a color density and a brightness value of the displayed image in accordance with the selected reference color;

wherein the one reference color is selected in a sequential order of a flesh tone, blue color and green color and the one reference color is selected when it is most frequently detected.

3. The method of claim 1, wherein the detecting step further comprises the sub-steps of:

outputting a voltage corresponding to a phase difference of a color subcarrier signal and a color signal of the detected reference color;

comparing the voltage with different respective reference voltages set in a plurality of comparators; and determining the detected reference color by logically combining the compared resultant voltages.

* * * * *